(12) United States Patent
Niehaus et al.

(10) Patent No.: US 10,501,386 B2
(45) Date of Patent: Dec. 10, 2019

(54) SOLID FUEL BODY, GAS GENERATOR, MODULE HAVING A GAS GENERATOR, AND PYROTECHNIC DRIVE UNIT

(75) Inventors: Michael Niehaus, Stutensee (DE); Bernd Lorbeer, Rostock (DE); Torsten Berg, Krakow am See (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 0 days.

(21) Appl. No.: 13/879,414

(22) PCT Filed: Aug. 4, 2011

(86) PCT No.: PCT/EP2011/003916
§ 371 (c)(1),
(2), (4) Date: Apr. 15, 2013

(87) PCT Pub. No.: WO2012/055450
PCT Pub. Date: May 3, 2012

(65) Prior Publication Data
US 2013/0200601 A1  Aug. 8, 2013

(30) Foreign Application Priority Data
Oct. 29, 2010 (DE) .................. 10 2010 049 765

(51) Int. Cl.
*B60R 21/264* (2006.01)
*C06D 5/00* (2006.01)
(Continued)

(52) U.S. Cl.
CPC .............. *C06D 5/00* (2013.01); *B60R 21/264* (2013.01); *B60R 21/2644* (2013.01); *C06B 45/00* (2013.01); *F42B 5/16* (2013.01)

(58) Field of Classification Search
CPC ... B60R 21/26; B60R 21/264; B60R 21/2644; C06D 5/00; C06B 45/00; F42B 33/025; F42B 1/02; F42B 3/04
(Continued)

(56) References Cited

U.S. PATENT DOCUMENTS 3,372,643 A * 3/1968 Kvavle ............... 102/204
3,580,180 A * 5/1971 Gawlick ............. F42B 1/00
102/285
(Continued)

FOREIGN PATENT DOCUMENTS

CN 2756356 2/2006
DE 10 2004 062 936 7/2006
(Continued)

*Primary Examiner* — Barry Gooden, Jr.
(74) *Attorney, Agent, or Firm* — Tarolli, Sundheim, Covell & Tummino LLP

(57) ABSTRACT

A solid propellant compact (10) in the form of a compact made of a powdered and/or granulated solid propellant, especially for inflators and/or actuators of a vehicle occupant restraint system, includes at least one recess on at least one of its sides. Solid propellant compacts (10) of this type are provided in an inflator (14) comprising at least one combustion chamber. A module includes such inflator (14) with an airbag inflatable by the inflator (14). A pyrotechnical drive unit (30) comprising a housing (32), a piston (34) movable in the housing (32) includes solid propellant compacts (10) of this type.

21 Claims, 2 Drawing Sheets

(51) Int. Cl.
 *C06B 45/00* (2006.01)
 *F42B 5/16* (2006.01)
(58) Field of Classification Search
 USPC ........ 280/736, 741; 102/334, 335, 283, 288, 102/292
 See application file for complete search history.

(56) References Cited

U.S. PATENT DOCUMENTS

| | | | | |
|---|---|---|---|---|
| 3,707,411 | A * | 12/1972 | Gawlick et al. | C06B 25/22 102/700 |
| 3,911,825 | A * | 10/1975 | Gawlick et al. | 102/285 |
| 4,581,998 | A | 4/1986 | Horst, Jr. et al. | |
| 4,699,400 | A * | 10/1987 | Adams | B60R 21/203 102/275.5 |
| 4,711,466 | A * | 12/1987 | Breed | B60R 21/33 280/741 |
| 4,817,828 | A * | 4/1989 | Goetz | 222/3 |
| 5,019,220 | A | 5/1991 | Taylor et al. | |
| 5,060,974 | A * | 10/1991 | Hamilton | B60R 21/272 280/736 |
| 5,078,422 | A * | 1/1992 | Hamilton | B60R 21/272 280/736 |
| 5,084,218 | A * | 1/1992 | Vos et al. | 264/3.4 |
| 5,101,730 | A | 4/1992 | Bender et al. | |
| 5,390,954 | A * | 2/1995 | Faigle et al. | 280/736 |
| 5,499,843 | A * | 3/1996 | Faigle et al. | 280/741 |
| 5,551,343 | A * | 9/1996 | Hock et al. | 102/288 |
| 5,575,499 | A * | 11/1996 | Kohno | 280/741 |
| 5,578,787 | A * | 11/1996 | Kobari et al. | 102/288 |
| 5,648,637 | A * | 7/1997 | Clark, III | 102/438 |
| 5,682,013 | A * | 10/1997 | Smith et al. | 149/6 |
| 5,804,758 | A * | 9/1998 | Marsaud et al. | 102/288 |
| 5,821,449 | A * | 10/1998 | Langsjoen et al. | 102/288 |
| 5,860,957 | A * | 1/1999 | Jacobsen | A61N 1/30 604/140 |
| 6,053,110 | A | 4/2000 | Marchant et al. | |
| 6,095,556 | A * | 8/2000 | Bailey | B60R 21/272 102/204 |
| 6,136,111 | A | 10/2000 | Lemons et al. | |
| 6,305,288 | B1 * | 10/2001 | Nilsson et al. | 102/288 |
| 6,415,715 | B1 * | 7/2002 | Nilsson et al. | 102/288 |
| 2002/0007885 | A1 * | 1/2002 | Serizawa et al. | 149/46 |
| 2004/0000250 | A1 * | 1/2004 | Stratum | F42B 5/02 102/441 |
| 2004/0216819 | A1 * | 11/2004 | Serizawa et al. | 149/46 |
| 2011/0239887 | A1 * | 10/2011 | Sandstrom | C06B 33/08 102/204 |
| 2015/0210605 | A1 * | 7/2015 | Zhang | C06B 45/14 149/15 |

FOREIGN PATENT DOCUMENTS

| | | |
|---|---|---|
| DE | 10 2006 044 899 | 4/2008 |
| JP | H10250525 | 9/1998 |
| JP | 2000239092 | 9/2000 |
| WO | 2004/094188 | 11/2004 |

\* cited by examiner

SOLID FUEL BODY, GAS GENERATOR, MODULE HAVING A GAS GENERATOR, AND PYROTECHNIC DRIVE UNIT

RELATED APPLICATIONS

This application corresponds to PCT/EP2011/003916, filed Aug. 4, 2011, which claims the benefit of German Application No. 10 2010 049 765.7, filed Oct. 29, 2010, the subject matter of which are incorporated herein by reference in their entirety.

BACKGROUND OF THE INVENTION

The invention relates to a solid propellant in the form of a compact made of powered and/or granulated solid propellant, especially for inflators and/or pyrotechnical drive units (also referred to as actuators) of an individual protection system for vehicles. The invention also relates to an inflator comprising at least one combustion chamber and a module including such inflator. Furthermore, the invention relates to a pyrotechnical drive unit including a housing with a piston movable within the housing.

From the state of the art it is known to compact solid propellant pellets for inflators in cylindrical shape from a powdered or granulated solid propellant. Solid propellant pellets of this type only allow a limited surface-to-volume ratio of the pellet, however. In order to allow rapid ignition or burning of the propellant in the inflator an as high surface-to-volume ratio of the solid propellant as possible is desirable.

It is further known to use solid propellant in the form of granules of various grain sizes for inflators. In the case of such granules no defined surface-to-volume ratio can be determined, however, which results in a certain variation of performance of the inflators. The surface structure of such granules is generally undefined and such granules may have an additional portion of broken granules or granule dust, which equally might result in a certain variation of performance of the inflators.

SUMMARY OF THE INVENTION

It is the object of the invention to provide a solid propellant compact having a defined and increased surface-to-volume ratio as well as an inflator the characteristic diagram of which provides a very short onset and/or an initially high gas generation with small variation of the performance. It is another object of the invention to provide a module including such inflator. It is a further object of the invention to provide a pyrotechnical drive unit including a housing, a piston movable within the housing and an igniting assembly including an igniting device and a plurality of said solid propellant compacts.

The object of the invention concerning the solid propellant compact is achieved by a generic solid propellant compact, the latter including at least one recess on at least one of its sides. In this way the surface-to-volume ratio is increased, thereby allowing rapid igniting and burning. Since a defined surface structure of the compact is predetermined, a defined surface-to-volume ratio of the solid propellant compact is provided, whereby a low variation of the performance of inflators or actuators can be achieved by solid propellant compacts of this type.

The solid propellant compacts are especially suited as propellant for inflators or actuators having characteristic diagrams that provide a very short onset and/or an initially high gas generation.

For example, the recess is concave and/or has a round, preferably circular cross-section. According to an embodiment, the recess is inversely dome-shaped. This permits in particular a simple mode of construction of the pressing mold of the compact.

An advantageous surface-to-volume ratio can be achieved by the concave recess which has a diameter between 50% and 100%, preferably between 80% and 98% of the diameter of the solid propellant compact and/or in which the maximum depth of the concave recess is between 20% and 90%, preferably between 30% and 50% of the height of the solid propellant compact.

The solid propellant compact can be in the form of pellets and/or have a substantially cylindrical basic shape.

A high mechanical stability of the solid propellant compact can be obtained by providing a central recess in one or both end faces, especially one single recess. It is also possible to provide a plurality of recesses.

For example, plural recesses are disposed on opposite sides, preferably on all sides, especially at the end faces, of the solid propellant compact and/or the plurality of recesses preferably having a diameter of less than 10% of the diameter of the solid propellant compact are arranged to be spread evenly or in particular patterns on at least one side of the solid propellant compact.

When molding the compact the adhesion of the solid propellant compact in the pressing mold can be reduced by shaping the recesses to be dished.

Preferably the recess has a first radius of curvature in its central area and a second radius of curvature in its marginal area, the two radii of curvature preferably having different signs.

It is possible that the at least one recess increases the surface of the side of the solid propellant compact on which it is provided by at least 10%, especially by at least 25%, further especially by at least 35%, compared to the surface of a side (theoretically) having no recess and/or that the at least one recess constitutes at least 20% of the surface of the side on which it is provided. The term "a side (theoretically) having no recess" is to mean that no further recess need to be provided on a respective side of the solid propellant compact in addition to the at least one recess, but that such recess can definitely be provided.

A concave recess of the solid propellant compacts can have a depth of from 1.2 mm to 5.4 mm, preferably from 1.8 mm to 3.0 mm. Furthermore, the concave recess of the solid propellants can have a diameter of from 3.0 mm to 6.0 mm, preferably from 4.8 mm to 5.8 mm.

In another embodiment of the invention, which can be designed separately from the afore-described embodiments but also combined with each of these embodiments, the pellet or the pellet blank has at least one concave recess on at least one of its sides (preferably base or top side, but also shell side), e.g. an indentation especially having a round cross-section. This increases the surface of the pellet which further accelerates the burning behavior.

The object of the invention regarding the inflator is achieved by an inflator according to the invention. The latter comprises at least one combustion chamber which in the non-activated state of the inflator is filled with a plurality of afore-described solid propellant compacts and wherein preferably all, or substantially all, solid propellant compacts have substantially the same design. This allows configuring the inflator with a characteristic diagram which provides a very short onset and/or an initially high gas generation.

Since a defined surface-to-volume ratio of the solid propellant compacts is given, the variation of the performance of the inflator is low.

The inflator can also comprise at least one combustion chamber, the combustion chamber being filled in the non-activated state of the inflator with a plurality of afore-described solid propellant compacts, wherein at least two different variants of shape of solid propellant compacts are arranged in layers in the combustion chamber. By such layered arrangement, for example an onset subdivided into several stages can be realized in the characteristic diagram of the inflator so that the onset can be further designed to be differentiated in time stages.

The object of the invention regarding the module is achieved by a module according to the invention comprising such inflator, an airbag inflatable by the inflator and fastening means for mounting the module, especially in the interior of a vehicle.

The object of the invention regarding the pyrotechnical drive unit is achieved by a pyrotechnical drive unit according to the invention comprising a housing, a piston movable in the housing and an igniting assembly having an igniting device and a plurality of solid propellant compacts designed according to at least one of the claims 1 to 10.

BRIEF DESCRIPTION OF THE DRAWINGS

Further features and advantages of the invention are resulting from the following description and the drawings that are referred to, in which.

DESCRIPTION

Figure 1:
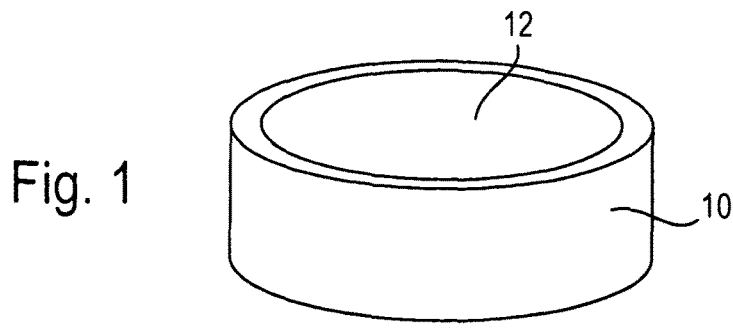
FIG. 1 shows a perspective view of a solid propellant compact according to a first embodiment of the invention.

FIG. 1 shows a perspective view of a first embodiment of a solid propellant 10 in the form of a compact of a powdered and/or granulated solid propellant.

The solid propellant compact 10 is a substantially cylindrical pellet, wherein a single recess 12 disposed centrally at the upper end face is provided.

Figure 2:
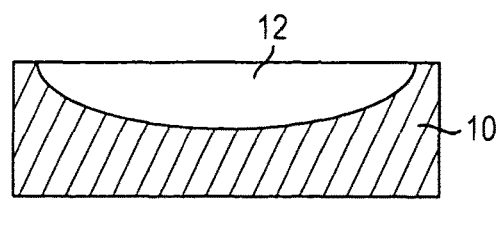
FIG. 2 shows a sectional view of the solid propellant compact according to FIG. 1.

FIG. 2 shows the solid propellant compact 10 in a sectional view. The diameter of the recess 12 amounts to approx. 90% of the diameter of the solid propellant compact. The maximum depth of the recess 12 in the central area of the recess 12 amounts to approximately 50% of the height of the solid propellant compact 10.

Due to the geometry of the recess 12, the surface of the solid propellant compact 10 is increased while the volume is simultaneously reduced vis-à-vis a solid propellant compact having no corresponding recess. In this way the surface-to-volume ratio is increased, whereby the time course of burning the solid propellant compact is varied and more rapid igniting and burning of the solid propellant is possible.

Figure 3:
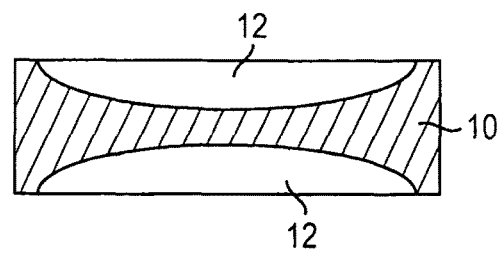
FIG. 3 shows a sectional view of a solid propellant compact according to a second embodiment of the invention.

A second embodiment of a solid propellant compact 10 is shown in FIG. 3. In this embodiment a recess 12 is disposed at each of the two end faces of the solid propellant compact 10. The recesses 12 are formed analogously to the first embodiment, wherein the maximum depth in the center of each recess 12 amounts to approximately 35% of the height of the solid propellant. In this embodiment the surface-to-volume ratio is further increased compared to the first embodiment.

Figure 4:
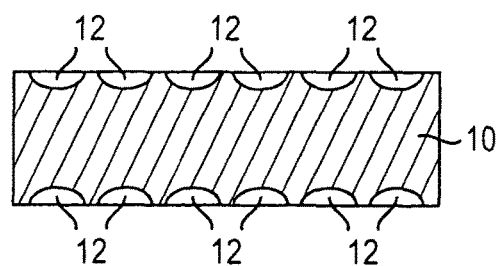
FIG. 4 shows a sectional view of a solid propellant compact according to a third embodiment of the invention.

A third embodiment is shown in FIG. 4. In this figure a plurality of recesses 12 is provided which is arranged to be spread in a regular pattern at both end faces of the solid propellant compact 10. The diameter of the individual recesses 12 is less than 10% of the diameter of the solid propellant compact 10. For example, recesses are arranged in hexagonal pattern, analogously to dimples of a golf ball.

Figure 5:
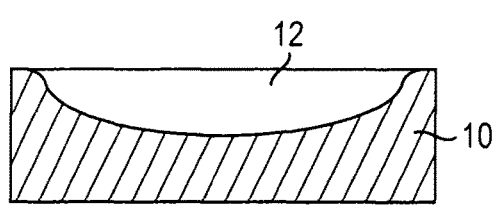
FIG. 5 shows a sectional view of a solid propellant compact according to a fourth embodiment of the invention.

FIG. 5 shows a fourth embodiment having a central recess 12 at the upper end face of the solid propellant compact 10, the recess 12 exhibiting a first radius of curvature in its central area and a second radius of curvature in its marginal area, the two radii of curvature having different signs.

Each of the first, second and fourth embodiments is formed to be in rotational symmetry.

However, also other forms of solid propellant compacts are possible that deviate from the basic shape of a circular-cylindrical pellet shown in the embodiments. It is noted that the term "cylindrical" in accordance with the invention is not restricted to a circular cylinder but may define any suitable closed (ring-shaped) contour of a base surface of a cylinder. In particular, also recesses can be provided on the surfaces of the cylinder shell and preferably on all surfaces of the solid propellant compact, e.g. a peripheral annular groove or axial recesses forming ribs there between, which permits to easily remove the compact from the mold.

The recesses are formed to be dished, wherein ejecting the solid propellant compacts from a pressing mold is facilitated when the direction of ejection of the solid propellant compact 10 from its pressing mold has a tangential component with respect to the surface of the pressing mold in the area of the recess 12.

The solid propellant compacts 10 exhibit such geometry that a surface is increased by at least 10%, especially by at least 25% and preferably by at least 35% compared to the surface of a solid propellant compact formed to have no recess. The recesses 12 form more than 20% of the surface of the side on which they are provided.

In the shown embodiments the solid propellant compacts are designed to be dimensionally stable so as to be capable of withstanding certain loads without breaking.

Alternatively, it is possible that at least one recess is formed as a predetermined breaking point at which a preferred breaking of the solid propellant compact is provided, whereby a substantially defined breaking point can be generated which after breaking once again increases the surface. It is especially imaginable to provide a respective recess in the area between the desired breaking point and the edge of the pellet, also on the side of the pellet opposing the predetermined breaking point.

Figure 6:
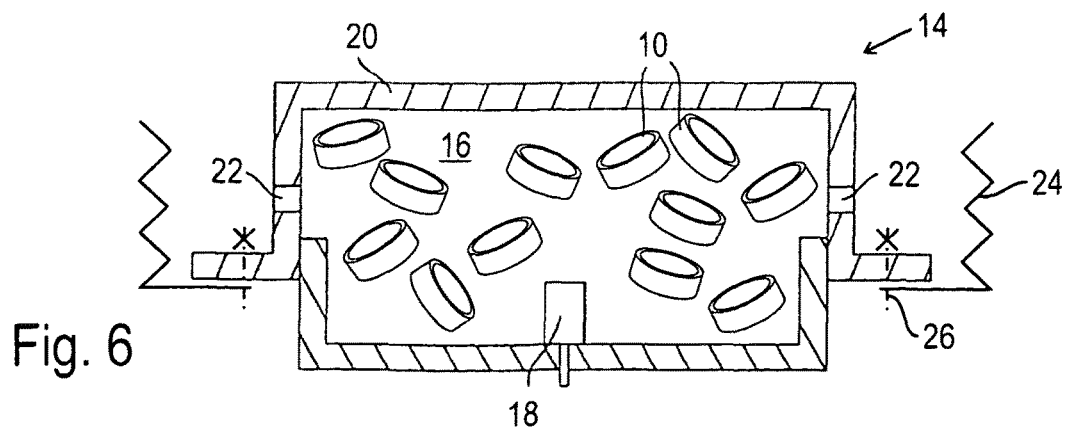
FIG. 6 shows an inflator according to the invention and a module according to the invention.

FIG. 6 shows an inflator 14 as part of a module. The inflator 14 comprises a combustion chamber 16 in which an igniter device 18 and a plurality of solid propellant compacts are provided. The combustion chamber 16 is surrounded by a housing 20 of the inflator 14 in which plural gas discharge orifices 22 are provided.

In the shown embodiment all solid propellant compacts 10 are of equal shape, i.e. exhibit an identical geometry.

As an alternative it is possible, however, that a defined mixture of different solid propellant compacts 10 is provided in the combustion chamber 16, either as a substantially homogenous mixture or in the form of a layered arrangement in which at least two variants of shape of solid propellant compacts 10 are disposed in layers in the combustion chamber 16, wherein said layers of different solid propellant compacts 10 can be directly adjacent to each other or else can be delimited against each other by a separate component, such as a non-woven insert.

Upon igniting the inflator 14 by the igniter device 18, the solid propellant is rapidly ignited and burnt due to the high surface-to-volume ratio of the solid propellant compact 10, which allows generation of a large amount of gas at the beginning of the igniting operation. Thus a very short onset of the inflator is permitted.

The inflator 14 is provided in a module of a vehicle occupant restraint system comprising an airbag 24 inflatable by the inflator 14 and a fastening means 26 for mounting the module in the interior of a vehicle.

Figure 7:
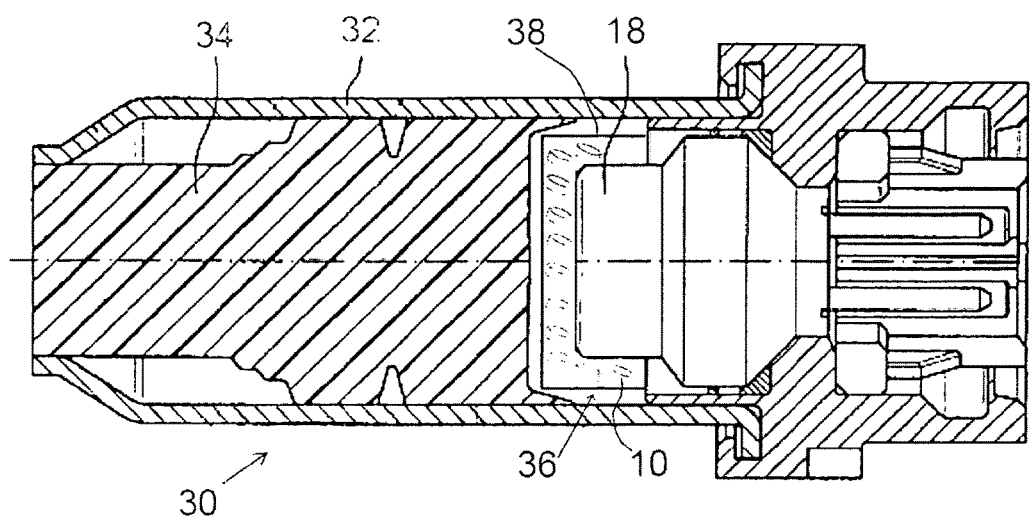
FIG. 7 shows a pyrotechnical drive unit according to the invention.

FIG. 7 shows a pyrotechnical drive unit (30) having a housing (32), a piston (34) movable in the housing (32) and an igniting assembly (36) comprising an igniting device (18) and a plurality of afore-described solid propellant compacts (10). In the case of release of the pyrotechnical drive unit (30) the igniter device (18) which can be connected, for example, to a control device not shown is activated. Thus a pyrotechnical charge not shown inside the igniter device (18) is ignited which generates pressure in the form of hot gas and/or hot particles, thereby the igniter device (18) being opened at its end face. The hot gas and/or hot particles flowing out of the igniter device (18) ignite the solid propellant compacts (10) which then burn off and in turn also generate pressure. The pressurized piston (34) is moved in the housing (32) and is at least partially forced out of the housing (32). Thus a certain stroke of the piston (34) is generated which constitutes a drive for various applications. It is possible, for instance, to provide such pyrotechnical drive unit (30) in a seat belt system not shown, a safety bar and/or a hood stay in a vehicle.

In FIG. 7 the afore-described solid propellant compacts (10) are enclosed by a sleeve (38) representing an additional member of the igniting assembly (36) and acting as pressure reservoir during burn-off of the solid propellant compacts (10). It is also imaginable to dispense with such sleeve (38); then the solid propellant compacts (10) would be stored loosely between the piston (34) and the igniter device (18), i.e. without any additional encasing by the sleeve (38).

Furthermore FIG. 7 shows the afore-described solid propellant compacts (10) to be spatially separated from the igniter device (18) which is not absolutely necessary, however. In this way, it is also possible that the solid propellant compacts (10) are integrated directly in the igniter device (18), i.e. they are accommodated together with the pyrotechnical charge of the igniter device (18) not shown inside the igniter device (18) either in a homogenous mixture or in layered form. Moreover it is also possible in this context that the afore-described solid propellant compacts (10) themselves constitute the pyrotechnical charge of the igniter device (18) not shown; in other words, that no further pyrotechnical components are provided inside the igniter device (18) apart from the afore-described solid propellant compacts (10).

The invention claimed is:

1. An individual protection system for vehicles comprising:
   a combustion chamber extending along a longitudinal axis and in which a plurality of solid propellant compacts are provided; and
   an igniter that is electrically actuatable to ignite the plurality of solid propellant compacts to actuate the individual protection system, each compact of the plurality of solid propellant compacts comprising a solid mass of powdered or granulated solid propellant having a cylindrical outer side wall centered along a longitudinal axis, and spaced first and second end walls through which the central longitudinal axis extends, the side wall and the first and second end walls defining an entire outer surface of the solid propellant compact, at least one of the first end wall and the second end wall includes at least one recess, at least a part of said each compact of the plurality of solid propellant compacts having an uninterrupted cross section of said propellant extending through the central longitudinal axis of the compact and parallel to the first and the second ends, wherein the plurality of solid propellant compacts are disposed randomly in the combustion chamber so that the central longitudinal axes of the solid propellant compacts are predominantly offset from the longitudinal axis of the combustion chamber and from each other such that the central longitudinal axes are predominantly noncollinear.

2. The individual protection system according to claim 1, wherein the at least one recess is concave or has a round circular cross-section.

3. The individual protection system according to claim 1, wherein the at least one recess is concave and has a diameter that is between 50% and 100% of a diameter of said each compact of the plurality of solid propellant compacts and wherein a maximum depth of the at least one concave recess is between 20% and 90% of a height of said each compact of the plurality of solid propellant compacts.

4. The individual protection system according to claim 1, wherein said each compact of the plurality of solid propellant compacts is pellet-shaped or has a substantially cylindrical basic shape.

5. The individual protection system according to claim 1, wherein a central recess is provided on at least at one of the first end wall and the second end wall or that a plurality of recesses are provided.

6. The individual protection system according to claim 1, wherein plural recesses are arranged on opposite sides on at least one of the first end wall and the second end wall of said each compact of the plurality of solid propellant compacts and wherein the plural recesses have a diameter of less than 10% of a diameter of said each compact of the plurality of solid propellant compacts and are arranged to be spread evenly or in predetermined patterns on at least one of the first and the second end walls of said each compact of the plurality of solid propellant compacts.

7. The individual protection system according to claim 1, wherein the at least one recess has a first radius of curvature in a central area and a second radius of curvature in a marginal area, the two radii of curvature having different signs.

8. The individual protection system according to claim 1, wherein the at least one recess increases a surface of one of the first and second end walls of said each compact of the plurality of solid propellant compacts on which it is provided by at least 10% compared to a surface of another of the first and the second end walls having no recess.

9. The individual protection system according to claim 1, wherein the at least one recess is concave and has a depth of 1.2 mm to 5.4 mm.

10. The individual protection system according to claim 1, wherein the at least one recess is concave and has a diameter from 3.0 mm to 6.0 mm.

11. The individual protection system according to claim 1, wherein substantially all of the plurality of solid propellant compacts are substantially of equal shape.

12. The individual protection system according to claim 1, wherein the combustion chamber comprises a combustion chamber of an inflator of an air bag module comprising an airbag inflatable by said inflator and a fastening means for mounting the module, especially in an interior of a vehicle.

13. The individual protection system according to claim 1, wherein the combustion chamber comprises a combustion chamber of a pyrotechnical drive unit comprising a housing, a piston movable in the housing and an igniting assembly which includes the igniter.

14. The individual protection system according to claim 1, wherein the at least one recess forms at least 20% of a surface of the end on which it is provided.

15. The individual protection system according to claim 1, wherein the at least one recess is inversely dome-shaped.

16. The individual protection system according to claim 1, wherein each compact has an uninterrupted volume defined solely by the end walls and the side wall.

17. The individual protection system according to claim 1, wherein said each compact of the plurality of solid propellant compacts is cylindrical in configuration and has a diameter of 3.0-12.0 mm.

18. The individual protection system according to claim 1, wherein said each compact of the plurality of solid propellant compacts is cylindrical in configuration and has a diameter of 4.9-7.25 mm.

19. The individual protection system according to claim 1, wherein the plurality of solid propellant compacts comprises compacts of at least two different variants of shape in a homogeneous mixture.

20. An individual protection system for vehicles comprising:
a combustion chamber extending along a longitudinal axis and in which a plurality of solid propellant compacts are provided; and
an igniter that is electrically actuatable to ignite the plurality of solid propellant compacts to actuate the individual protection system, each compact of the plurality of solid propellant compacts comprising a solid mass of powdered or granulated solid propellant having a cylindrical outer side wall centered along a longitudinal axis, and spaced first and second end walls through which the central longitudinal axis extends, the side wall and the first and second end walls defining an entire outer surface of the solid propellant compact, at least one of the first end wall and the second end wall includes at least one recess, at least one of the plurality of solid propellant compacts being free from bores that extend through the solid mass of powdered or granulated solid propellant, wherein the plurality of solid propellant compacts are disposed randomly in the combustion chamber so that the central longitudinal axes of the solid propellant compacts are predominantly offset from the longitudinal axis of the combustion chamber and from each other such that the central longitudinal axes are predominantly noncollinear.

21. An individual protection system for vehicles comprising:
a combustion chamber extending along a longitudinal axis and in which a plurality of solid propellant compacts are provided; and
an igniter that is electrically actuatable to ignite the plurality of solid propellant compacts to actuate the individual protection system, each compact of the plurality of solid propellant compacts comprising a solid mass of powdered or granulated solid propellant having a cylindrical outer side wall centered along a longitudinal axis, and spaced first and second end walls through which the central longitudinal axis extends, the side wall and the first and second end walls defining an entire outer surface of the solid propellant compact, at least one of the first end wall and the second end wall includes at least one recess, said each compact of the plurality of solid propellant compacts being free from bores that extend through the solid mass of powdered or granulated solid propellant, wherein the plurality of solid propellant compacts are disposed randomly in the combustion chamber so that the central longitudinal axes of the solid propellant compacts are predominantly offset from the longitudinal axis of the combustion chamber and from each other such that the central longitudinal axes are predominantly noncollinear.

* * * * *